United States Patent [19]
Bish et al.

[11] Patent Number: 5,106,708
[45] Date of Patent: Apr. 21, 1992

[54] BIPOLAR BATTERY AND ASSEMBLY METHOD

[75] Inventors: James R. Bish, Anderson; George W. Brutchen, Winchester; Mark E. Boram, Anderson, all of Ind.

[73] Assignee: General Motors Corporation, Detroit, Mich.

[21] Appl. No.: 580,977

[22] Filed: Sep. 12, 1990

[51] Int. Cl.$^5$ .................................................. H01M 10/18
[52] U.S. Cl. .................................... 429/160; 429/185; 29/623.2
[58] Field of Search ..................... 429/160, 185, 210; 29/623.2

[56] References Cited

U.S. PATENT DOCUMENTS

| | | | |
|---|---|---|---|
| 3,167,456 | 1/1965 | Schilke et al. | 136/10 |
| 3,692,587 | 9/1972 | Vetor et al. | 136/134 R |
| 4,504,556 | 3/1985 | Pearson | 429/136 |
| 4,525,438 | 6/1985 | Pearson | 429/149 |
| 4,777,101 | 10/1988 | Blomberg et al. | 429/129 |

FOREIGN PATENT DOCUMENTS

2070844A 9/1981 United Kingdom.

*Primary Examiner*—William R. Dixon, Jr.
*Assistant Examiner*—Deborah Jones
*Attorney, Agent, or Firm*—Lawrence B. Plant

[57] ABSTRACT

Bipolar battery and method of making intercell connections between adjacent cells thereof including a container having an intercell partition a section of which is thicker than the remainder of the partition. The thickened section has an opening therethrough receiving the intercell connectors, which opening has a mouth at each end thereof confronting one of a set of adjacent cell compartments. Barriers are provided contiguous the mouths of the opening and define therebetween a region in the opening for receiving sealant injected thereinto. The barriers confine the sealant to the region and prevent it from exuding into the adjacent cell compartments. In one embodiment, the barriers comprise rails molded onto the bipolar electrodes. In another embodiment, the barriers comprise compressed glass mats.

45 Claims, 5 Drawing Sheets

BIPOLAR BATTERY AND ASSEMBLY METHOD

This invention relates to multicell, bipolar batteries and a method of making same, and more particularly to means/method for preventing electrolyte communication between adjacent cells thereof.

BACKGROUND OF THE INVENTION

Bipolar batteries employ either one of two types of bipolar electrodes. The first, or "face-to-face" type of bipolar electrode, utilizes an electrolyte impervious, conductive sheet having a first polarity, electrochemically active material applied (e.g., pasted) onto one face of the sheet and an opposite polarity, electrochemically active material applied to the opposite face of the sheet. These electrodes are stacked in the battery such that the opposite polarity faces of adjacent electrodes oppose each other across an electrolyte-filled gap, and are separated one from the other by an electrolyte-permeable separator. The second, or "side-by-side", type of bipolar electrode comprises an electrically conductive substrate (e.g., a grid work of conductive wires) having two separate, substantially coplanar, side-by-side electrode portions (hereafter plates) thereon each of which contains an electrochemically active material of opposite polarity to the other. The two opposite polarity plates are electrically connected to each other by an electrically conductive link which comprises a central segment of the shared conductive substrate which is free of electrochemically active material and lies intermediate the two opposite polarity plates and in essentially the same plane as the plates. Such side-by-side bipolar electrodes, and a multicell primary battery made therefrom, are described in Schilke et al U.S. Pat. No. 3,167,456, assigned to the assignee of the present invention. Schilke et al's, side-by-side bipolar electrodes are arranged in overlapping fashion so as to form a plurality of cell elements each housed in a separate cell compartment of a container and comprising a stack of the positive and negative polarity plates of different bipolar electrodes alternately interleaved one with the other. The bipolar electrodes are arranged such that the first polarity plate of each bipolar electrode resides in one compartment and the opposite polarity plate of the same bipolar electrode resides in an adjacent cell compartment in the fashion depicted in FIG. 1 hereof. An opening between the compartments receives the electrochemically neutral center segment of Schilke et al's conductive grid, which segment electrically links the opposite polarity plates together through the opening. Several such links stacked in each opening form the battery's intercell connector and serve to electrically series connect the several cell elements together.

BRIEF DESCRIPTION OF THE INVENTION

The present invention relates to improvements to Schilke et al-type multicell bipolar batteries using "side-by-side" bipolar electrodes but as applied to secondary batteries and particularly recombinant Pb-acid batteries. It is an object of the present invention to provide secondary, Schilke et al-type, multicell bipolar batteries with an improved electrolyte barrier between adjacent cell compartments, and a method of making same, which substantially prevents electrolyte leakage between adjacent cells via the battery's intercell connector(s), thereby preventing self discharge and increasing both the shelf and operating lives of the battery. It is a further object of the present invention to provide a durable, gas-recombinant, secondary, multi-cell battery of the Schilke et al bipolar electrode type, and method of making same, wherein the battery has an improved electrolyte barrier between adjacent cell compartments. These and other objects and advantages of the present invention will become more apparent from the description thereof which follows.

The invention comprehends a multicell electric storage battery, and method of making same, and more particularly an improved means/method for preventing leakage of electrolyte between adjacent cell compartments in Schilke et al-type, secondary, batteries having side-by-side bipolar electrodes. The battery will preferably be a gas recombinant battery wherein oxygen generated at one plate moves across the interelectrode gap to an opposite polarity plate and recombines with hydrogen generated thereat. The battery comprises a container, including a cover, having a plurality of walls defining a plurality of individual cell compartments, a galvanic cell element in each of the cell compartments comprising a stack of positive and negative polarity plates alternately interleaved one with the other and separated one from the other by an electrolyte permeable separator, an opening or passage between adjacent cell compartments through which the cell elements in adjacent compartments are electrically connected, and a unique means/method for substantially isolating adjacent cell compartments one from the other so as to substantially prevent electrolyte leakage therebetween while at the same time permitting electrical communication between the adjacent compartments. More specifically, at least one of the walls defining the cell compartment is a partition which separates one cell compartment from the next. A generally central section of the partition is thicker than the remainder of the partition and serves to sealingly receive the battery's intercell connector. Intercell connector means electrically series connect adjacent cell elements together through an opening extending between adjacent cell compartments through the thicker section of the partition, which intercell connector means comprises a plurality of electrically conductive links stacked in the opening between the compartments, wherein each link joins a pair of coplanar opposite polarity plates into a side-by-side bipolar electrode. The several bipolar electrodes are arranged and positioned in the container, ala Schilke et al, such that the conductive link joining the opposite polarity plates of each bipolar electrode is substantially aligned with other similar links for other such electrodes within the opening in the thickened section of the partition. The intercell connector will preferably include a border extending along the edge of each plate adjacent the container opening for collecting current from the plate and conducting it to the link. Sealant barrier means extending between adjacent bipolar electrodes in the opening are provided at the mouths of the opening (i.e., at the opposite ends thereof) confronting adjacent compartments. The barrier means defines a region within the opening between the compartments into which sealant is injected and serves to substantially confine the sealant to that region during injection. Sealant is injected into the region defined by the barrier means, embeds the links therein and forms an electrolyte-tight partition between adjacent cell compartments.

In accordance with one embodiment of the invention, the barrier means comprises a plurality of electrically insulating bars secured to (e.g., molded onto) the intercell connector means of each bipolar electrode. The bars are spaced apart within the opening and define therebetween a substantially closed region for receiving and containing the injected sealant. More specifically, a first set of bars are secured to opposite faces of the positive plate portion of the intercell connector link and lie contiguous with one mouth of the opening while a second set of bars are secured to the opposite faces of the negative plate portion of the intercell connector link and lie contiguous with the other mouth of the opening. The bars on the positive plate side are spaced from the bars on the negative plate side of the intercell link by a gap which forms the region for receiving the sealant. The bars have end portions on their extremities which extend beyond the extent of the intercell connecting link and are adapted to be received in pockets formed in the thickened section and flanking at opposite ends of the opening between adjacent compartments. The bars are preferably formed of a thermoplastic material molded directly onto each bipolar electrode by positioning the electrode in an appropriate mold and injecting the bar-forming material into the mold. Glass-filled polypropylene (i.e. 20% glass) is a preferred bar-forming material. The pockets in the thickened section of the intercell partition will preferably include undercut recess portions adapted to receive complementarily shaped ears on the ends of the bars.

The bipolar electrodes are alternately stacked in the container in such a manner as to: (1) constitute the individual cell element stacks; (2) align the intercell connector links one with the other in the opening; (3) cause the bars on each bipolar electrode to abut the bars on the next adjacent bipolar electrode in the same opening so as to space the interconnecting link of each electrode from the interconnecting link of adjacent electrodes in the same opening as well as to provide a barrier to the escape of sealant subsequently injected into the gaps between the bars; and (4) mate the end portions of the bars with the pockets in the container walls. The pair of bars on one side of an electrode is preferably shaped so as to provide a beveled ridge along the outermost surface thereof while the pair of bars on the other side of the electrode is provided with a complementarily-shaped (i.e., beveled) channel in the outermost surface. During stacking of the electrodes, the beveled ridge on one bipolar electrode nests within the complementary beveled channel on the next adjacent bipolar electrode set in the opening for optimizing the alignment of the electrodes within the cell compartments and for improving the containment of sealant during injection.

After stacking of the electrodes in the container, a cover is secured thereto as by gluing, heat sealing, etc. The cover has apertures therein aligned with the region between the bars to be filled with sealant. Liquid sealant (e.g., an uncured thermosetting resin or a heated thermoplastic resin) is injected under low pressure into the region between the bars so as to completely fill the region and embed the links therein as well as fill the pockets mated with the end portions of the bars. The sealant may comprise a hardenable material, e.g., melted thermoplastic (e.g., high melt flow polypropylene or polybutylene) or uncured epoxy which, upon hardening, bonds to the container walls and the links and holds them rigidly together in the opening and provides the battery with considerable vibration resistance. An elastomeric sealant, such as silicone rubber, may also be used where rigid anchoring of the electrodes is not important. A particularly effective sealant comprises a polyolefin-gased thermoplastic elastomer such as Santoprene ® or Kraton ® sold commercially by Monsanto Chemical Co. or Shell Chemical Co., respectively. The sealant effectively forms a substantially electrolyte impermeable barrier to electrolyte passage between the cell compartments via the intercell connector opening and substantially prevents leakage of electrolyte from one cell to the next. The sealant will preferably be auto-expandable (e.g., include a blowing agent) for causing the sealant to swell within the region and pockets after it is injected therein to more effectively fill any voids therein and between the links which might not otherwise be filled by injection alone.

Figure 3:
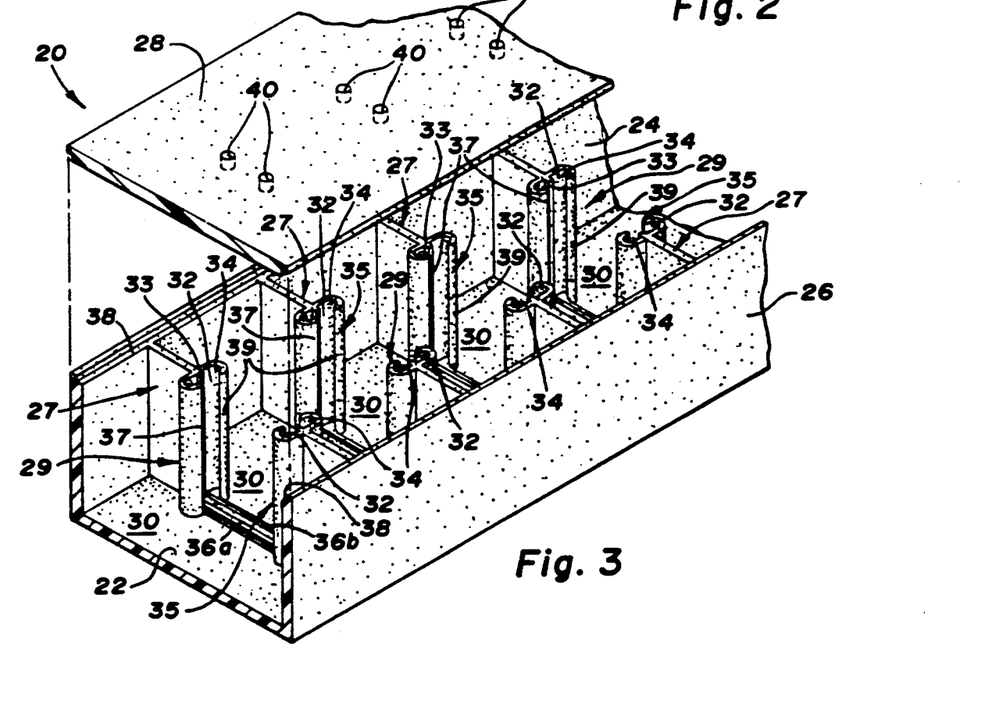
FIG. 3 is an exploded, perspective view of a container for housing a bipolar battery in accordance with the present invention.

The container will preferably include ribs integral with the container walls and extending between the ends of the opening for engaging the bars on the end bipolar electrode in the stack and, like the bars themselves, serve to confine the sealant during injection to the region of the opening. In the case of an elongated opening between the compartments such as illustrated in FIG. 3 of the drawings, the link joining the opposite polarity plates of each bipolar electrode will preferably have at least one (preferably several) holes therethrough to facilitate complete filling of the region defined by the bars and ribs. The holes are sized so as to effectively divide the interconnecting link into a plurality of smaller links without substantially increasing the IR drop thereacross.

In another and preferred embodiment, the battery has bibulous, fibrous electrolyte-immobilizing separators between the plates and the sealant outflow barrier comprises edges of the separators contiguous with the mouths of the opening being compressed between the plates on both sides of the opening. More specifically, the bipolar battery of the present invention will preferably be of the so-called gas-recombinant type wherein a bibulous, fibrous mat is positioned between the plates for absorbing and substantially immobilizing the battery's electrolyte while permitting oxygen transport between adjacent plates in the same element. The edges of one set of mats in one cell compartment lie contiguous with one mouth of the opening in the thickened section of the partition and the edges of another set of mats in the adjacent cell compartment lie contiguous with the other mouth of the opening. During stacking, the initially lofty mat is compressed sufficiently at its edge as to be substantially undisplaceable by, and impermeable to, sealant injected into the opening. In other words, the mat is so compressed that the injected sealant will neither significantly displace nor penetrate the mat and hence will be confined substantially to the region of the opening defined by the compressed edges of the mat. The mat will preferably comprise glass microfibers such as are well known in the art for use in gas-recombinant batteries. One such glass mat material is commercially available in a variety of grades from the Hollingsworth & Vose Company under the trade name HOVOSORB ®. However, other fibrous mats made from olefins or other polymer fibers effective to immobilize the electrolyte and permit oxygen transport therethrough are also useful. One such Dynel ® or polypropylene mat useful for this purpose is described in Corbin et al U.S. Pat. No. 3,553,020 assigned to the assignee of the present invention.

DETAILED DESCRIPTION OF SPECIFIC EMBODIMENTS OF THE INVENTION

The invention will better be understood when considered in the light of the following detailed description of certain specific embodiments thereof which is given hereafter in conjunction with the several drawings in which.

Figure 1:
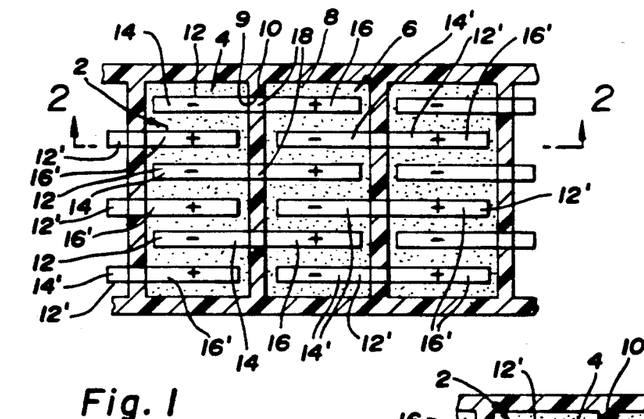
FIG. 1 is a schematic, sectioned view illustrating a multicell bipolar battery having side-by-side bipolar electrodes.
Figure 2:
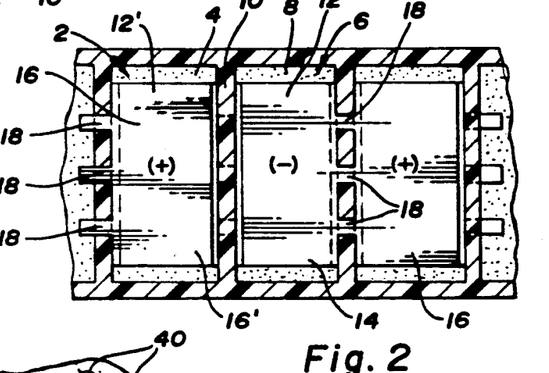
FIG. 2 is a view in the direction 2—2 of FIG. 1.

FIGS. 1 and 2 illustrate a multicell bipolar battery of the side-by-side bipolar electrode type having a first cell element 2 in container compartment 4 and a second cell element 6 in container compartment 8 and an intercell partition 10 separating the compartments 4 and 8 each from the other. Bipolar electrodes 12 comprise a negative polarity plate portion 14 and a positive polarity plate portion 16 each in separate compartments 4 and 8 respectively of the container 2 and electrically joined one to the other by an electrically conductive link 18 sealingly passing through opening 9 in the partition 10. The several bipolar electrodes 12 are interleaved with similar electrodes 12' (with associated negative and positive plates 14' and 16' respectively) which are alternately oriented 180° to each other such that in each cell element the negative plate portion (e.g., 14) of one bipolar electrode (e.g., 12) lies face-to-face with the positive plate portion (e.g., 16') of an adjacent bipolar electrode (e.g., 12').

FIG. 3 shows a container 20 comprising a bottom wall 22, side walls 24 and 26, intercell wall 27 (hereafter intercell partition) and having a cover 28 which forms the top wall of the container 20. The container 20 defines a plurality of compartments 30 each adapted to receive an individual cell element. The intercell partition 27 includes a central section 29 which is thicker than the remainder of the partition and includes pockets 32 having undercut recesses 34 therein as will be discussed in more detail hereinafter. Each compartment 30 is connected to the next adjacent compartment by an opening 35 extending through the thickened section 29 of the partition 27 and lying between each pair of opposed pockets 32 which flank the opening 35 as shown.

The opening 35 has a first mouth 37 confronting one cell compartment and a second mouth 39 at the opposite end thereof confronting the next adjacent cell compartment. A pair of ribs 36a and 36b extend along the bottom wall 22 between the recesses 32 as will be described in more detail hereinafter. The cover 28 is adapted to mate with the shoulders 38 on the walls 24 and 26 of container 20 and is bonded thereto as by heat sealing, adhesives or otherwise. The cover 28 includes a plurality of holes 40 therethrough which are aligned with the openings 35 in the container 20 to permit injection of the sealant into the openings 35 after the battery has been sealed closed to form the electrolyte-type intercell connector seal in accordance with the present invention.

FIGS. 4–7 depict a bipolar electrode 42 having a positive plate portion 44 and a negative plate portion 46 electrically interconnected one to the other by an electrically conductive link 48. More specifically, the bipolar electrode 42 includes a common conductive substrate or grid comprising grid wires 47 and pasted with electrochemically active material 55. The positive plate 44 of the bipolar electrode 42 is sheathed in an envelope 50 of microporous battery separator material (e.g., microporous polyethylene) and the several electrodes, in a given stack thereof, are separated one from the other by a bibulous electrolyte-absorbent, fibrous mat 52 (e.g., glass) such as, for example, is commonly found in gas-recombinant type batteries. A similar envelope 50' encases the positive electrode portion 44' of bipolar electrode 42' (see FIG. 5).

Figure 4:
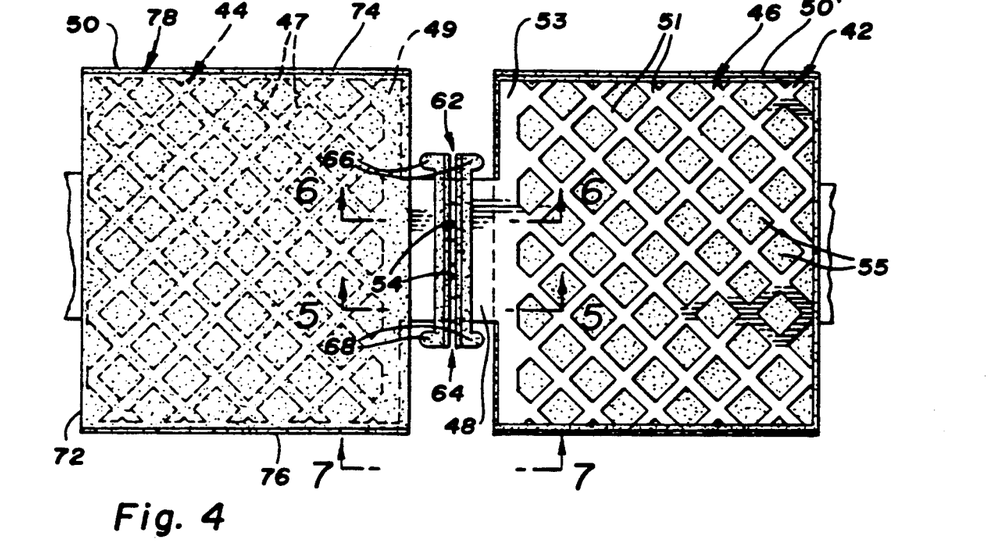
FIG. 4 is a plan view of a bipolar electrode and sealant barrier in accordance with one embodiment of the present invention.
Figure 5:
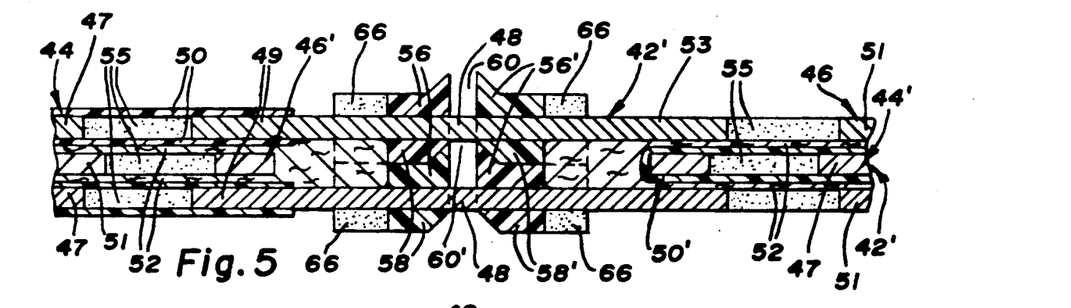
FIG. 5 is a view in the direction 5—5 of FIG. 4.
Figure 6:
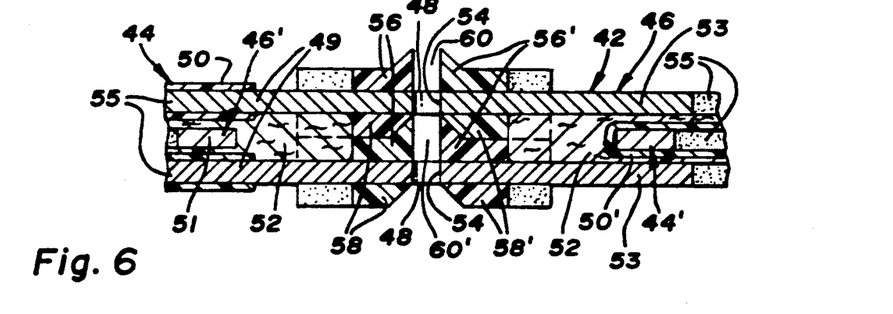
FIG. 6 is a view of the direction 6—6 of FIG. 4.
Figure 7:
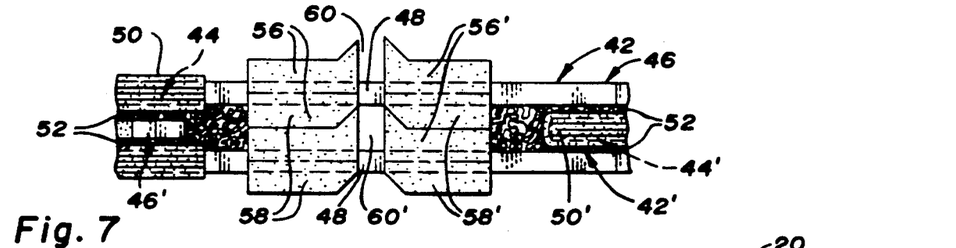
FIG. 7 is a view in the direction 7—7 of FIG. 4.

Each bipolar electrode 42, 42' shares a common conductive substrate comprising a plurality of interconnecting grid wires 47 extending from a current collecting border 49 on the positive plate side and grid wires 51 extending from current collecting border 53 on the negative plate side of the bipolar electrode 42. The link 48 joins the respective current collecting borders 49 and 53 and will preferably include a plurality of apertures 54 therethrough which apertures 54 are aligned with similar apertures in adjacent bipolar electrodes 42 in the stack such that a sealant injection nozzle can extend through the several aligned apertures to the bottom of the container 20 as will be discussed in more detail hereinafter.

A pair of electrically non-conductive bars 56 and 56' are secured to the link 48 near borders 49 and 53 on one face of the electrode 42. Another pair of bars 58 and 58' are similarly affixed to the link 48 near borders 49 and 53 on the opposite face of the bipolar electrode 42. The bars 56—56' and 58—58' will preferably comprise polypropylene (most preferably including about 20% glass fibers for strength) and will preferably be molded in situ onto the substrate by positioning the electrode 42 in an appropriate mold and injecting the polypropylene into the mold in such a manner as to bond the bar material to the border.

Figure 8:
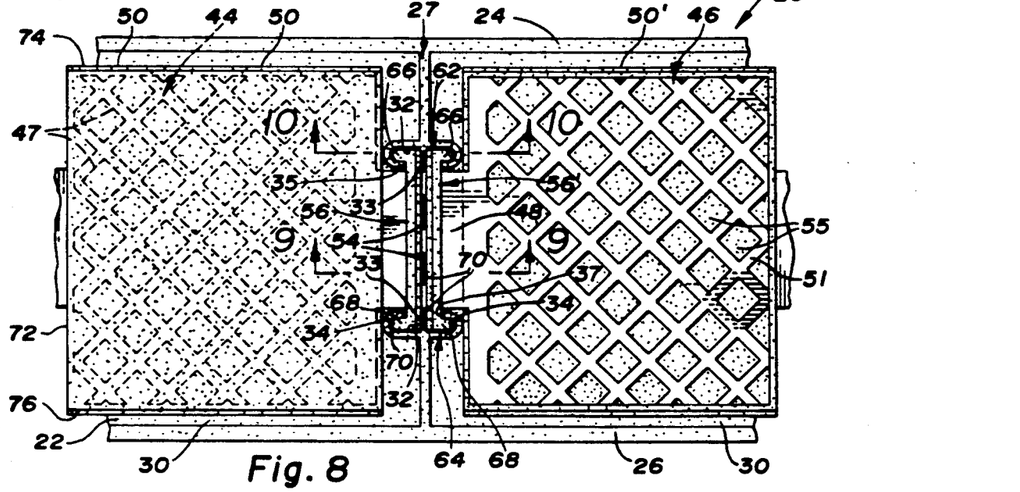
FIG. 8 is similar to FIG. 4 but showing the bipolar electrode positioned in the container shown in FIG. 3.
Figure 9:
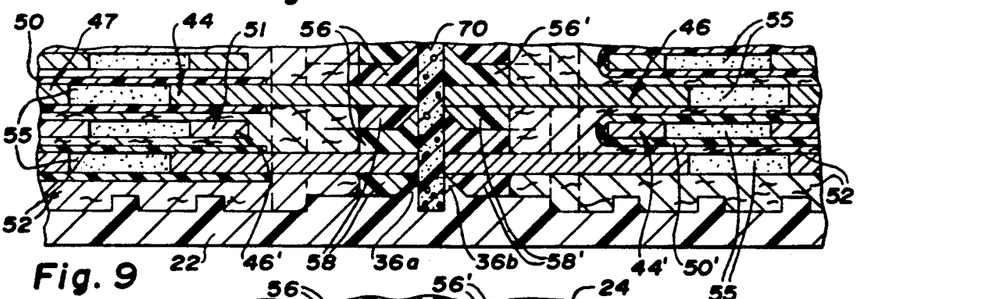
FIG. 9 is a view in the direction 9—9 of FIG. 8.
Figure 10:
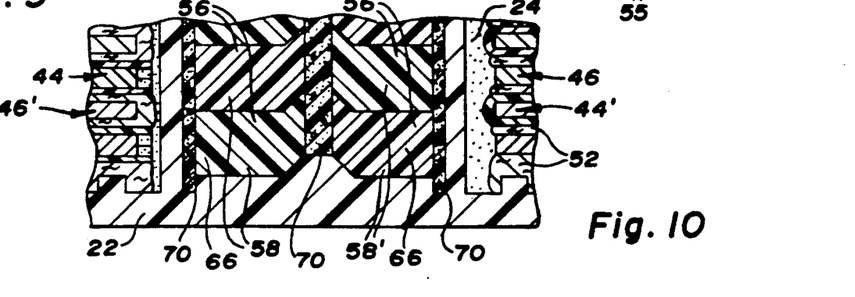
FIG. 10 is a view in the direction 10—10 of FIG. 8.

During assembly, the several bipolar electrodes 42 and 42' are stacked in the battery container in the manner described in connection with FIGS. 1 and 2 and such that the bars 56—56' and 58—58' on every other bipolar electrode in the stack abut one another in the opening 35 (i.e., adjacent the mouths 37 and 39) so as to space the several bipolar electrodes apart and provide a barrier to the outflow of sealant injected therebetween. Each set of bars 56-58 and 56'-58' for each bipolar electrode 42 are spaced apart from each other by gaps 60 and 60' which collectively form a region (i.e., gaps 60—60') between the bars and surrounding the links 48 into which sealant is injected during the assembly process. During assembly, the several bipolar electrodes are stacked in the manner described above such that the several bars abut one another and provide the aforesaid sealant-receiving region therebetween. As best shown in FIGS. 4 and 9, the bars 56—56, and 58—58' extend the length of the opening 35 and have ends 62 and 64 thereon which mate with the pockets 32 in the thickened section 29 of the partition 27. The ends of the bars 62-64 include ears 66 and 68 projecting laterally therefrom, which ears conform substantially to the shape of the undercut recesses 34 in the pocket 32 for nesting in such pocket (see FIG. 8).

After the bipolar electrodes 42 have been assembled in the manner described above, liquid sealant 70 is injected into the region between the several bars under sufficient pressure to cause the sealant to flow into all the voids and interstitial spaces between the bars 56, 56', 58 and 58', the links 48 and between the ends of the bars and the pockets 32 so as to completely fill any voids or spaces therein and so bond with both the bars and the walls of the pocket as to produce an electrolyte-impermeable barrier between adjacent cell compartments. Glass-filled epoxy resins have proved to be effective thermosetting sealants. Alternatively, the sealant may remain flexible throughout its life and accordingly may comprise an electrolyte resistant elastomeric material such as silicon rubber which is injected into the opening as a liquid before curing to an elastic state. The sealant may also include a blowing agent or the like which causes the sealant to swell or expand after injection so as to insure complete filling of the region between the bars and the recesses at the ends of the opening. Such blowing agents result in the sealant having a multitude of small closed cell pores distributed throughout.

The sealant 70 will preferably be injected into the region between the bars after the cover 28 has been secured to the container 20 and by inserting a plurality of nozzles (not shown) through the holes 40 in the cover 28 and down through the several apertures 54 in the intercell links 48 until the ends of the nozzles reach substantially the bottom wall 22 of the container 20. At that time, the sealant is injected into the region between the bars under low pressure and the nozzles are slowly withdrawn from the region between the bars at a rate commensurate with the rate at which the sealant is dispensed into the region between the bars and so that all air is displaced from the opening ahead of the moving front of sealant and out through the openings 40 and the cover 28.

As best shown in FIG. 9, the ribs 36a and 36b projecting upwardly from the bottom wall 22 abut the bars 58 and 58' on the bipolar electrode 42' at the end of the stack and contiguous the bottom wall 22 of the container 20 and together therewith form the sealant-outflow barrier thereat. As best shown in FIGS. 3 and 8, the pockets 32 include a ridge 33 which projects into the region between the bars at the ends thereof. In the event that the sealant 70 in the pockets 32 does not bond well to the surface of the container, the ridge 33 serves to increase the length of the path any leaking electrolyte film must take between the cell compartments along the interface between the sealant 70 and the walls defining the pockets 32. This increases the IR drop through the film and reduces current leakage therethrough.

The microporous separator 50 sheaves the positive plate 44 of each bipolar electrode and takes the form of an envelope formed by bending a sheet of the separator material along the centerline 72 (see FIG. 4) and bonding (e.g., heat sealing) the lateral edges 74 and 76 to themselves outboard the edges of the plate 44. The remaining edge (i.e., adjacent the link) of the envelope 78 may be left open or sealed to itself.

Figure 11:
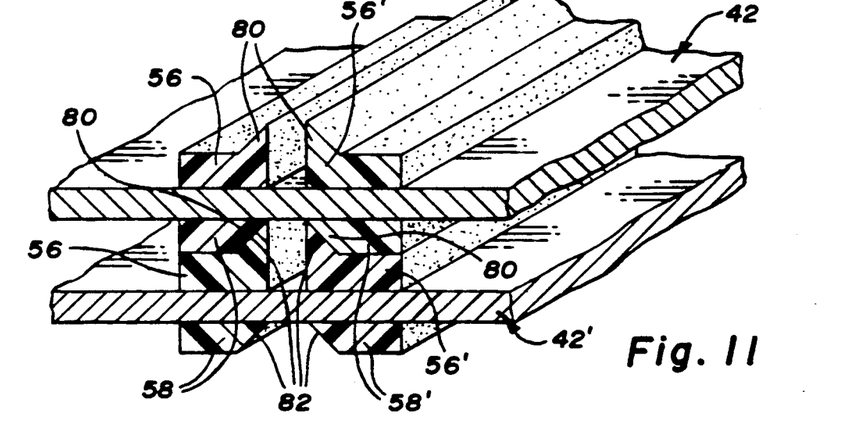
FIG. 11 is a sectioned, perspective view of the intercell connector region of the bipolar electrodes showing sealant barrier bars in accordance with the present invention.

FIG. 11, inter alia, shows one pair of bars 56—56' on the bipolar electrode 42 having a beveled ridge 80 extending the length thereof and the other pair of bars 58—58' for the same electrode having a complementarily-shaped beveled channel 82 of such size and shape that, during stacking, the beveled ridge 80 on the bars of one bipolar electrode nests within the beveled channel on the bars of the next adjacent bipolar electrode. This serves not only to align the electrodes during stacking but provides greater resistance to sealant outflow from the region between the bars.

Figure 12:
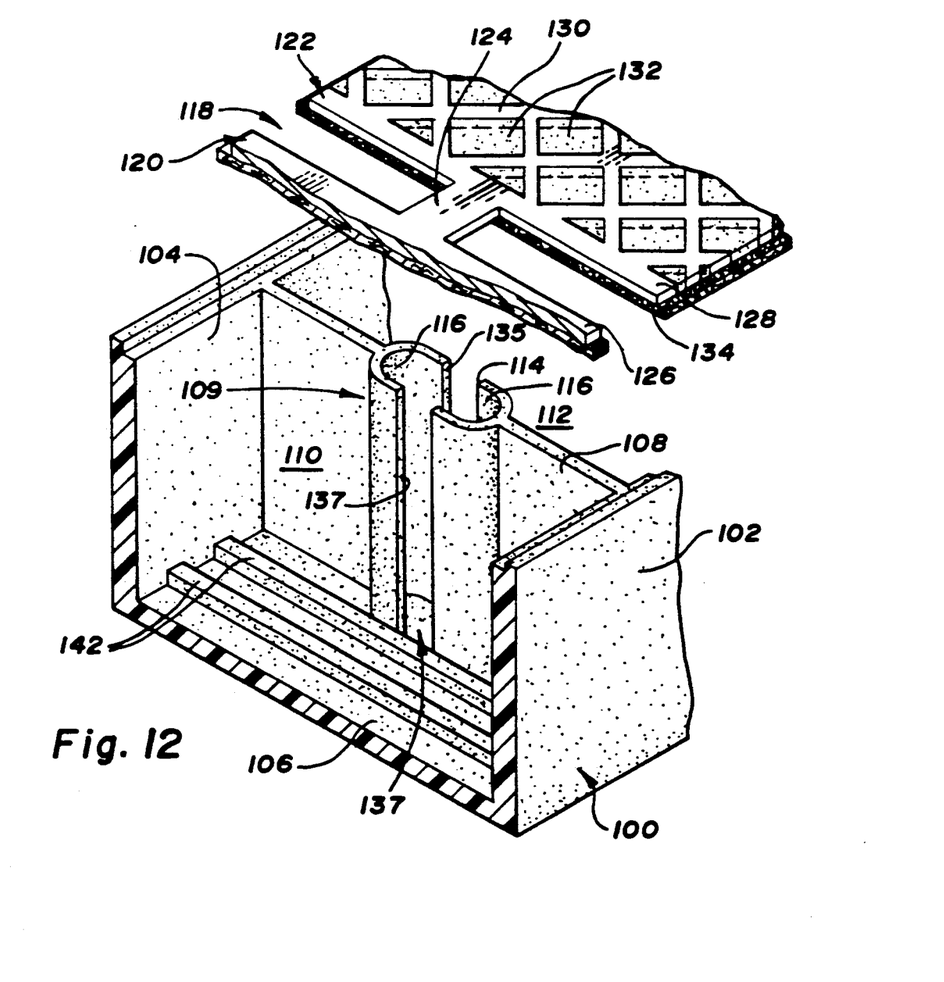
FIG. 12 is a sectioned, exploded, perspective view of another embodiment of the present invention.
Figure 13:
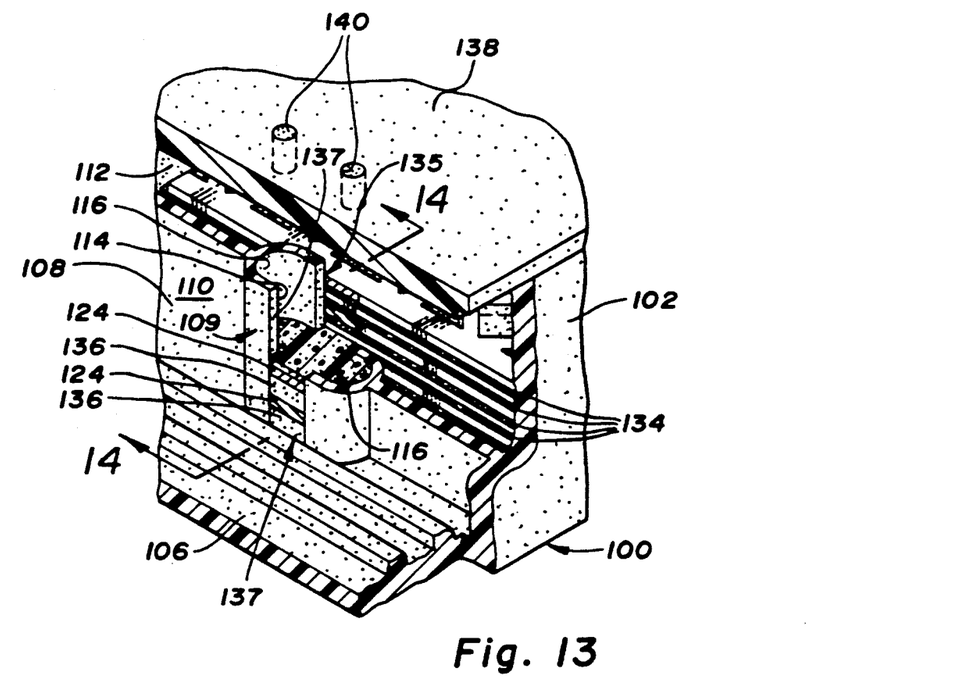
FIG. 13 is a view similar to FIG. 12 showing the intercell connector region of the battery after the bipolar electrodes have been stacked in the container.
Figure 14:
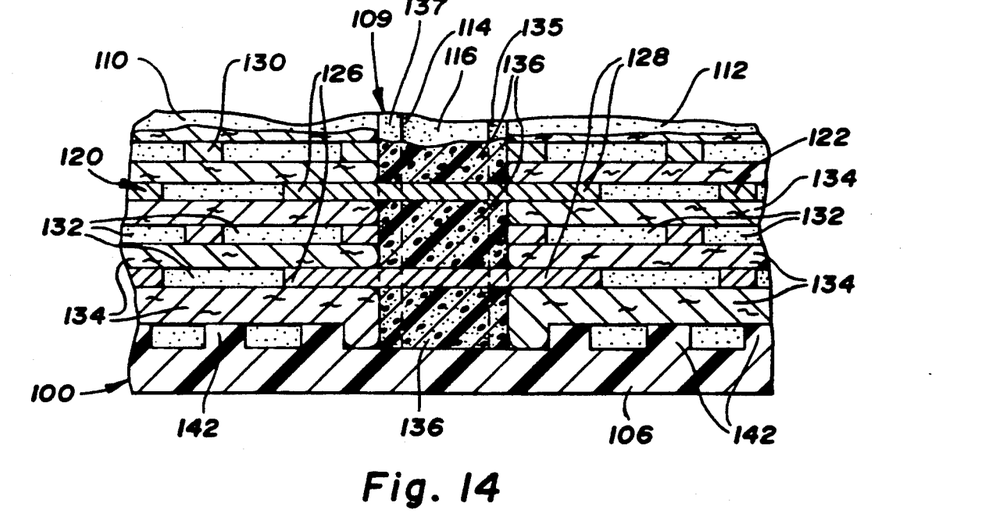
FIG. 14 is a view in the direction 14—14 of FIG. 13.

FIGS. 12-14 show another and preferred embodiment of the present invention. FIGS. 12-14 show a container 100 having side walls 102 and 104, bottom wall 106 and intercell partition wall 108 separating adjacent cell compartments 110 and 112 one from the other. The intercell partition wall 108 has a thickened section 109 including an opening 114 therethrough for electrical communication between the cell elements in adjacent cell compartments and include pockets 116 flanking the opening 114. The bipolar electrode 118 includes a positive plate portion 120, a negative plate portion 122 and an electrically conducting intercell connector link 124. Each of the plate portions 120 and 122 include a conductive border 126 and 128 respectively connected to the link 124 and serving effectively as a bus bar to collect the current flowing from their associated plates. Each plate will itself comprise essentially a grid work of conductive wires 130 embedded in an active material paste 132. The several bipolar electrodes 118 are stacked in the container 100 in the same manner as described in conjunction with FIG. 1 and are separated from each other by a bibulous electrolyte-absorbent, electrolyte immobilizing mat 134 such as is typically found in gas-recombinant type batteries. This mat 134 will preferably comprise microglass fibers such as are well known to those skilled in the art of gas-recombinant batteries. As best shown in FIGS. 13 and 14, the glass mats 134 abut the mouths 135 and 137 of the opening 114, and are so compressed between the several bipolar electrodes as to provide a barrier to the outflow of sealant 136 from the opening 114 and pockets 116 during injection thereof. Similar to the embodiment described in FIGS. 1-11, the container 100 includes an upper wall comprising a cover 138 having a pair of holes 140 therein and aligned with the pockets 116. Sealant injection nozzles (not shown) are inserted through one or both of the holes 140 and extend to near the bottom wall 106 of the container 100. The sealant is then injected with slow withdrawal of the nozzles commensurate with the rate of sealant flow and such that the sealant displaces air from the opening 114 and the recesses 116 and expels it through the holes 140. The container wall 106 includes a plurality of ribs 142 which space the cell element from the wall 106 and provide for extra electrolyte capacity as well as electrolyte circulation within the cell.

While the invention has been disclosed primarily in terms of specific embodiments thereof it is not intended to be limited thereto but rather only to the extent set forth hereafter in the claims which follows.

The embodiments of the invention in which an exclusive property or privilege is claimed are defined as follows:

1. A method of making a multicell electric storage battery having a container including a cover and comprising a plurality of walls defining a plurality of individual cell compartments, one of said walls being an intercell partition separating one cell compartment from the next and having a section which is thicker than the remainder of said partition and adapted to receive intercell connector means therein, a galvanic cell element in each of said compartments comprising a stack of positive and negative polarity plates alternately interleaved one with the other and separated one from the other by an electrolyte permeable separator, an opening through said section in said partition providing a passage between adjacent cell compartments for electrically coupling said cell elements in said adjacent compartments, a mouth at each end of said opening each confronting one of said adjacent compartments, and intercell connector means electrically series connecting adjacent said cell elements together through said opening and comprising a plurality of electrically conductive links each joining a pair of substantially coplanar, opposite polarity plates into a bipolar electrode in which a positive polarity plate of a first cell element in one cell compartment is connected directly to a negative polarity plate in a second cell element in an adjacent cell compartment comprising the steps of:

positioning barrier means between adjacent said electrodes in each said stack, said barrier means lying substantially contiguous with said mouths so as to define a region therebetween for receiving and retaining sealant injected thereinto;

stacking said bipolar electrodes in said container so to form said cell elements in said compartments and such that (1) the link for each electrode is substantially aligned in said opening with other links from other electrodes, and (2) said barrier means provides a barrier to the escape of sealant from said region into said compartments during injection of said sealant into said region;

injecting a sealant into said region to so fill said region with sealant and embed said links therein as to prevent electrolyte leakage between said compartments through said opening.

2. A method according to claim 1 wherein said barrier means comprises a pair of electrically insulating bars secured to each side of a said electrode at opposite ends of said electrode's link and said electrodes are stacked in said container such that said bars abut one another within said opening.

3. A method according to claim 1 wherein said electrolyte permeable separator comprises an electrolyte absorbent mat substantially immobilizing all of the electrolyte between the plates of each cell element and including the step of compressing a peripheral portion of said mat between said electrodes adjacent said mouths to form said barrier means externally of said opening.

4. A method according to claim 1 wherein one of said walls is provided by said cover and said injecting is accomplished through an aperture in at least one of said walls.

5. A method according to claim 1 wherein said sealant is injected through a nozzle which extends through said aperture into said region to near a wall of said container which is opposite said aperture and said nozzle is withdrawn from said region during sealant injection at a rate commensurate the rate at which said sealant is injected into said region.

6. A method according to claim 1 wherein said sealant is auto-expandable and expands during said injecting to facilitate filling of said region.

7. A method according to claim 1 wherein said auto-expandable sealant contains a blowing agent which expands said sealant into a microporous mass.

8. A method according to claim 1 wherein said each said link has at least one hole therethrough, the holes for all of the links are aligned in said opening and said sealant is injected through said holes.

9. A method according to claim 1 wherein said sealant is hardenable and including the step of allowing said sealant to harden after injection.

10. A method of making a multicell electric storage battery having a container including a cover and comprising a plurality of walls defining a plurality of individual cell compartments, one of said walls being an intercell partition separating one cell compartment from the next and having a section which is thicker than the remainder of said partition and adapted to receive an intercell connector means therein, an opening through said section connecting adjacent cell compartments said opening having a mouth at each end thereof confronting one of said compartments, a galvanic cell element in each of said compartments comprising a stack of positive and negative polarity plates alternately interleaved one with the other and separated one from the other by an electrolyte permeable separator, and intercell connector means electrically series connecting adjacent said cell elements together through said opening and comprising a current collecting border along at least one edge of each plate and a plurality of links each joining a pair of substantially coplanar, opposite polarity plates into a bipolar electrode in which the current collecting border of a positive polarity plate of a first cell element in one cell compartment is connected directly to the current collecting border of a negative polarity plate in a second cell element in an adjacent cell compartment comprising the steps of:

forming a pair of opposing pockets in said section flanking said opening;

securing a pair of electrically insulating bars to each side of a said electrode at opposite ends of said electrode's link such that the bars on the positive plate side of the link are spaced from the bars on the negative plate side of the link and define a region therebetween for receiving and retaining sealant injected thereinto, said bars each having end portions on the extremities thereof extending beyond the lateral extent of the link;

stacking said bipolar electrodes in said container so as to form said cell elements in said compartments and such that (1) the link for each electrode is substantially aligned in said opening with other links from other electrodes, (2) the bars on adjacent electrodes passing through said opening abut one another in said opening so as to space the links of each said electrode from the links of adjacent electrodes in said opening and provide a barrier to the escape of sealant from said region and out of said mouths into said compartments, and (3) said end portions mate with said pockets; and injecting a sealant into said region so as to substantially fill said region and recesses and embed said links therein so as to prevent electrolyte leakage between said adjacent cell compartments through said opening.

11. A method according to claim 10 wherein one of said walls is provided by said cover and said injecting is accomplished through an aperture in at least one of said walls.

12. A method according to claim 11 wherein said sealant is injected through a nozzle which extends through said aperture into said region to near a wall of said container which is opposite said aperture and said nozzle is withdrawn from said region during sealant injection at a rate commensurate the rate at which said sealant is injected into said region.

13. A method according to claim 10 wherein said sealant is auto-expandable and expands during said injecting to facilitate filling of said region and recesses.

14. A method according to claim 13 wherein said auto-expandable sealant contains a blowing agent which expands said sealant into a microporous mass.

15. A method according to claim 10 including the step of molding said bars onto said electrodes.

16. A method according to claim 10 wherein said container has a pair of integral parallel ribs extending between said recesses on a wall defining said opening, and said electrodes are stacked in said container such that the bars on the electrode most proximate said wall abut said ribs.

17. A method according to claim 10 wherein each said link has at least one hole therethrough, the holes for all of the links are aligned in said opening and said sealant is injected through said holes.

18. A method according to claim 10 wherein said pockets each includes an undercut recess, said end portions includes an ear shaped complementarily to a said recess and said ear is nested within said recess when said electrodes are stacked in said container.

19. A method according to claim 10 wherein a first pair of said bars on one side of a said electrode together define a beveled ridge extending between said ends, a second pair of said bars on the opposite side of said electrode together define a channel extending between said ends and having a shape substantially complementary to said ridge, and stacking said electrodes in said container such that a said ridge on a said first pair of bars from a first electrode nests within a said channel in a second pair of bars in a said second electrode next adjacent said first electrode in said opening.

20. A method according to claim 10 wherein said bars engage the electrode's link.

21. A method according to claim 20 wherein said bars engage the plates.

22. A method according to claim 10 wherein said sealant is elastomeric.

23. A method according to claim 10 wherein said sealant is hardenable and including the step of allowing said sealant to harden after injection.

24. A method of making a multicell electric storage battery having a container including a cover and comprising a plurality of walls defining a plurality of individual cell compartments, one of said walls being an intercell partition separating one cell compartment from the next and having a section which is thicker than the remainder of said partition and adapted to receive an intercell connector means therein, an opening through said section connecting adjacent cell compartments, a mouth at each end of said opening each confronting one of said compartments, a galvanic cell element in each of said compartments comprising a stack of positive and negative polarity plates alternately interleaved one with the other and separated one from the other by an electrolyte permeable separator, said plates each having a current collecting border along at least one edge thereof, and intercell connector means electrically series connecting adjacent said cell elements together through said opening and comprising a plurality of electrically conductive links each joining a pair of substantially coplanar, opposite polarity plates into a bipolar electrode in which the current collecting border of a positive polarity plate of a first cell element in one cell compartment is connected directly to the current collecting border of a negative polarity plate in a second cell element in adjacent cell compartment comprising the steps of:

forming a pair of opposing pockets in said section flanking said opening;

securing an electrically insulating bar to each side of each of said borders in said bipolar electrode such that the bars on the positive plate's border are spaced apart from the bars on the negative plate's border and define a region therebetween for receiving and retaining sealant injected thereinto, said bars each having end portions on the extremities thereof extending beyond said borders;

stacking said bipolar electrodes in said container so as to form said cell elements in said compartments and such that (1) the link for each electrode is substantially aligned in said opening with other links from other electrodes, (2) the bars on adjacent electrodes passing through said opening abut one another in said opening so as to space the links of each said electrode from the links of adjacent electrodes in said opening and provide a barrier to the escape of sealant from said region and out of said mouths into said compartments, and (3) said end portions mate with said pockets;

injecting a hardenable sealant into said region so as to substantially fill said region and pockets and embed said links in said sealant so as to substantially prevent leakage of electrolyte between said adjacent cell compartments; and allowing said sealant to harden.

25. A method of making a gas-recombinant multicell electric storage battery having a container including a cover and comprising a plurality of walls defining a plurality of individual cell compartments, one of said walls being an intercell partition separating one cell compartment from the next and having a section which is thicker than the remainder of said partition and adapted to receive intercell connector means therein, a galvanic cell element in each of said compartments comprising a stack of positive and negative polarity plates alternately interleaved one with the other and separated one from the other by a bibulous mat for absorbing and substantially immobilizing the battery's electrolyte while permitting oxygen transport between said plates, a current collecting border along at least one edge of each of said plates, an opening through said section in said partition providing a passage between adjacent cell compartments for electrically coupling said elements in said adjacent compartments, a mouth at each end of said opening each confronting one of said adjacent compartments and intercell connector means electrically series connecting adjacent said cell elements together through said opening and comprising a plurality of electrically conductive links each joining a pair of substantially coplanar, opposite polarity plates in adjacent elements into a bipolar electrode in which the current collecting border of a positive polarity plate of a first cell element in one cell compartment is connected directly to the current collecting border of a negative polarity plate in a second cell element in an adjacent cell compartment comprising the steps of:

stacking said bipolar electrodes in said container so as to form said cell elements in said compartments and such that (1) the link for each electrode is substantially aligned in said opening with other links from other electrodes forming said adjacent cell elements, and (2) said current collecting borders compress the bibulous mats sufficiently at said mouths as to substantially prevent escape of sealant from said opening into said compartments during injection; and     injecting a sealant into said opening so as to substantially fill said opening and embed said links in said sealant so as to substantially prevent leakage of electrolyte between said adjacent cell compartments.

26. A method according to claim 25 wherein said mat comprises glass fibers.

27. A method of making a gas-recombinant multicell electric storage battery having a container including a cover and comprising a plurality of walls defining a plurality of individual cell compartments, one of said walls being an intercell partition separating one cell compartment from the next having a section which is thicker than the remainder of said partition and adapted to receive intercell connector means therein, a galvanic cell element in each of said compartments comprising a stack of positive and negative polarity plates alternately interleaved one with the other and separated one from the other by a bibulous mat for absorbing and substantially immobilizing the battery's electrolyte while permitting oxygen transport between said plates, a current collecting border along at least one edge of each of said plates, an opening between adjacent cell compartments providing a passage therebetween for electrically coupling said elements in said adjacent compartment said opening having a mouth at each end thereof confronting one of said adjacent compartments, and intercell connector means electrically series connecting adjacent said cell elements together through said opening and comprising a plurality of electrically conductive links each joining a pair of substantially coplanar, opposite polarity plates in adjacent elements into a bipolar electrode in which the current collecting border of a positive polarity plate of a first cell element in one cell compartment is connected directly to the current collecting border of a negative polarity plate in a second cell element in an adjacent cell compartment comprising the steps of:

forming a pair of pockets in said section flanking said opening;

stacking said bipolar electrodes in said container so as to form said cell elements in said compartments and such that (1) the link for each electrode is substantially aligned in said opening with other links from other electrodes, and (2) said current collecting borders compress said bibulous mats sufficiently on both ends of said opening as to provide a barrier at each of said mouths sufficient to substantially prevent escape of sealant from said opening into said compartments during injection thereof into said opening; and     injecting a sealant into said opening so as to substantially fill said opening and said pockets and embed said links in said sealant so as to substantially prevent electrolyte leakage between adjacent cell compartments.

28. A method of making a gas-recombinant multicell electric storage battery having a container including a cover and comprising a plurality of walls defining a plurality of individual cell compartments, one of said walls being an intercell partition separating one cell compartment from the next and having a section which is thicker than the remainder of said partition and adapted to receive intercell connector means therein, a galvanic cell element in each of said compartments comprising a stack of positive and negative polarity plates alternately interleaved one with the other and separated one from the other by a bibulous mat for absorbing and substantially immobilizing the battery's electrolyte while permitting oxygen transport between said plates, an opening through said section in said partition providing a passage between adjacent cell compartments for electrically coupling said elements in said adjacent compartments, a mouth at each end of said opening each confronting one of said adjacent compartments and intercell connector means electrically series connecting adjacent said cell elements together through said opening and comprising a plurality of electrically conductive links each joining a pair of substantially coplanar, opposite polarity plates in adjacent elements into a bipolar electrode in which a positive polarity plate of a first cell element in one cell compartment is connected directly to a negative polarity plate in a second cell element in an adjacent cell compartment comprising the steps of:

stacking said bipolar electrodes in said container so as to form said cell elements in said compartments and such that (1) the link for each electrode is substantially aligned in said opening with other links from other electrodes, and (2) the bibulous mats are compressed sufficiently on both ends of said opening contiguous said mouths sufficient to provide a barrier against the escape of sealant from said opening into said compartments during injection of said sealant;

injecting a sealant into said opening so as to substantially fill said opening and embed said links in said sealant so as to substantially prevent electrolyte leakage barrier between adjacent cell compartments.

29. A bipolar, multicell electric storage battery having a container comprising a plurality of walls defining a plurality of individual cell compartments, one of said walls being an intercell partition separating one cell compartment from the next and having a section which is thicker than the remainder of said partition and adapted to receive intercell connector means therein, a galvanic cell element in each of said compartments comprising a stack of positive and negative polarity plates alternately interleaved one with the other and separated one from the other by an electrolyte permeable separator, a passage through said section between adjacent cell compartments, said passage having a first end confronting one of said compartments and a second end confronting a second compartment adjacent said one compartment in said container, intercell connector means electrically series connecting adjacent said cell elements together through said passage and comprising a plurality of electrically conductive links each joining a pair of substantially coplanar, opposite polarity plates into a bipolar electrode in which the positive polarity plate of the bipolar electrode is located in a first cell element in one cell compartment and the negative polarity plate of the electrode is located in a second cell element in an adjacent cell compartment, barrier means extending between adjacent electrodes in said passage and contiguous with said ends for preventing injected sealant outflow from said passage during assembly, and sealant so filling said passage, embedding said links and forming a substantially electrolyte-tight seal between adjacent cell compartments as to substantially prevent electrolyte leakage between adjacent cell compartments.

30. The battery according to claim 29 wherein said barrier means is affixed to said electrodes and lies inboard the ends of said passage.

31. The battery according to claim 29 wherein said separator comprises an electrolyte absorbent mat substantially immobilizing all of the electrolyte between the plates of each cell element and said barrier means comprises peripheral portions of said mat compressed between said electrodes contiguous with said ends and externally of said passage means.

32. According to claim 30 wherein said barrier means comprise non-conductive bars.

33. According to claim 32 wherein bars are molded in situ.

34. According to claims 32 wherein said bars have ends which mate with pockets in the partition section at opposite sides of said passage means.

35. According to claim 31 wherein said mat comprises fiber batting.

36. According to claim 35 wherein said fiber comprises glass.

37. The battery according to claim 29 wherein said sealant is elastomeric.

38. The battery according to claim 37 wherein said sealant comprises acid-resistant silicon rubber.

39. The battery according to claim 29 wherein said sealant comprises a hardened material resulting from a fluid precursor thereof injected into said region.

40. The battery according to claim 39 wherein said material is selected from the group consisting of thermoplastic and thermosetting resins.

41. The battery according to claim 40 wherein said material comprises a thermoplastic having substantially the same composition as said container.

42. The battery according to claim 41 wherein said thermoplastic is polypropylene.

43. The battery according to claim 40 wherein said thermosetting plastic comprises epoxy resin.

44. The battery according to claim 29 wherein said links each have an aperture therein and the apertures for the several links are aligned in said passage means.

45. The battery according to claim 29 wherein said sealant is microporous.

* * * * *